(12) United States Patent
Byun et al.

(10) Patent No.: US 9,142,814 B2
(45) Date of Patent: Sep. 22, 2015

(54) RECHARGEABLE BATTERY

(75) Inventors: Sang-Won Byun, Yongin-si (KR);
Byung-Kyu Ahn, Yongin-si (KR);
Chi-Young Lee, Yongin-si (KR)

(73) Assignees: SAMSUNG SDI CO., LTD., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 195 days.

(21) Appl. No.: 13/064,320

(22) Filed: Mar. 18, 2011

(65) Prior Publication Data

US 2012/0040213 A1 Feb. 16, 2012

(30) Foreign Application Priority Data

Aug. 16, 2010 (KR) ........................ 10-2010-0078848

(51) Int. Cl.
*H01M 2/12* (2006.01)
*H01M 2/04* (2006.01)
(52) U.S. Cl.
CPC .......... *H01M 2/1294* (2013.01); *H01M 2/0456* (2013.01); *H01M 2/1241* (2013.01)
(58) Field of Classification Search
CPC .................................................. H01M 2/1241
USPC .......................................................... 429/56
See application file for complete search history.

(56) References Cited

U.S. PATENT DOCUMENTS

| | | | |
|---|---|---|---|
| 4,987,520 A * | 1/1991 | Rots .............................. | 361/521 |
| 6,571,816 B2 | 6/2003 | Morishita et al. | |
| 2002/0150813 A1 * | 10/2002 | Park et al. ....................... | 429/56 |
| 2007/0154782 A1 | 7/2007 | Cho et al. | |
| 2008/0171260 A1 * | 7/2008 | Kim et al. ....................... | 429/82 |
| 2009/0068548 A1 * | 3/2009 | Kaplan .......................... | 429/56 |
| 2011/0206957 A1 * | 8/2011 | Byun .............................. | 429/56 |
| 2012/0021259 A1 | 1/2012 | Kim et al. | |

FOREIGN PATENT DOCUMENTS

| | | |
|---|---|---|
| JP | 2002-367582 A | 12/2002 |
| KR | 2001-0089144 A | 9/2001 |
| KR | 10 2007-0071232 A | 7/2007 |
| KR | 10-2008-0036740 A | 4/2008 |
| KR | 10 2008-0067105 A | 7/2008 |
| KR | 10 2010-0007047 A | 1/2010 |
| KR | 10-1106323 B1 | 1/2012 |

OTHER PUBLICATIONS

Korean Office Action in KR 10-2010-0078848, dated Oct. 12, 2011 (Byun, et al.).
Korean Office Action in KR 10-2010-0078848, dated May 29, 2012 (Byun, et al.).

* cited by examiner

*Primary Examiner* — Ula C Ruddock
*Assistant Examiner* — Scott J Chmielecki
(74) *Attorney, Agent, or Firm* — Lee & Morse, P.C.

(57) ABSTRACT

A rechargeable battery including an electrode assembly, the electrode assembly including an anode, a cathode, and a separator therebetween; a case accommodating the electrode assembly, the case having an opening; a cap plate coupled to the opening of the case, the cap plate having a discharge hole; and a vent plate coupled to the discharge hole, wherein the vent plate includes a main notch part corresponding to the discharge hole, and a sub-notch part separated from the main notch part.

12 Claims, 6 Drawing Sheets

RECHARGEABLE BATTERY

BACKGROUND

1. Field

Embodiments relate to a rechargeable battery.

2. Description of the Related Art

Rechargeable batteries may be repeatedly charged and discharged, unlike primary batteries that cannot be recharged. Low-capacity rechargeable batteries may be used for portable compact electronic apparatuses, e.g., mobile phones, notebook computers, and camcorders, and high-capacity rechargeable batteries may be widely used as, e.g., a power source for driving a motor of a hybrid vehicle, etc.

Recently, a high-output rechargeable battery using a non-aqueous electrolyte having high energy density has been developed. The high-output rechargeable battery may include a plurality of rechargeable batteries connected in series so as to be used for driving a motor for an apparatus requiring a large amount of power, e.g., an electrical vehicle. The rechargeable battery may have, e.g., a cylindrical shape or a rectangular shape.

When the rechargeable battery is repeatedly charged and discharged, gas may be generated inside the rechargeable battery and an internal pressure thereof may increase. If the internal pressure inside the rechargeable battery continues to increase, the rechargeable battery may explode.

To prevent explosion of the rechargeable battery, a gas discharge hole may be included in a cap plate of the rechargeable battery. The discharge hole may be closed and sealed by a vent plate that may open if the internal pressure of the rechargeable battery exceeds a predetermined value.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery.

At least one of the above and other features and advantages may be realized by providing a rechargeable battery including an electrode assembly, the electrode assembly including an anode, a cathode, and a separator therebetween; a case accommodating the electrode assembly, the case having an opening; a cap plate coupled to the opening of the case, the cap plate having a discharge hole; and a vent plate coupled to the discharge hole, wherein the vent plate includes a main notch part disposed at a distance from an edge of the vent plate, and a sub-notch part separated from the main notch part.

The sub-notch part may be between the main notch part and the edge of the vent plate.

The sub-notch part may be closer to the edge of the vent plate than the main notch part.

A depth of the main notch part may be deeper than a depth of the sub-notch part.

A length of the main notch part may be about equal to or longer shorter than a length of the sub-notch part.

The main notch part may include a first notch at a center of the vent plate, the first notch extending along a lengthwise direction of the vent plate; and a second notch intersecting the first notch, and the sub-notch part may include a first sub-notch extending lengthwise along a same direction as the first notch.

A length of the first notch of the main notch part may be about equal to or shorter than a length of the first sub-notch of the sub-notch part.

The first sub-notch of the sub-notch part may be between the first notch of the main notch part and the edge of the vent plate.

The sub-notch part may further include a second sub-notch, the first and second sub-notches being symmetrically arranged relative to the first notch.

The main notch part may include a first notch at a center of the vent plate, the first notch extending along a lengthwise direction of the vent plate; and a second notch intersecting the first notch, the second notch having an angled shape at a portion thereof intersecting the first notch, the sub-notch part may have an angled shape corresponding to the angled shape of the second notch, the sub-notch part including a third sub-notch separated from the second notch.

A length of the second notch of the main notch part may be shorter than or about equal to a length of the third sub-notch of the sub-notch part.

The third sub-notch of the sub-notch part may be between the second notch of the main notch part and the edge of the vent plate.

The main notch part may further include a third notch, the second and third notches being symmetrically arranged relative to the first notch; the sub-notch part may include a fourth notch, the third and fourth notches being symmetrically arranged relative to the first notch; the third notch may have an angled shape at a portion thereof intersecting the first notch; and the fourth sub-notch may have an angled shape corresponding to the angled shape of the third notch, the fourth sub-notch being separated from the third notch.

The main notch part may include a first notch at a center of the vent plate, the first notch extending along a lengthwise direction of the vent plate; and a second notch intersecting the first notch, the second notch having an angled shape at a portion thereof intersecting the first notch, and the sub-notch part may have a curved shape open toward the second notch, the sub-notch part including a fifth sub-notch separated from the second notch.

The main notch part may further include a third notch, the second and third notches being symmetrically arranged relative to the first notch; the sub-notch part may further include a sixth sub-notch, the fifth and sixth sub-notches being symmetrically arranged relative to the first notch; the third notch may have an angled shape at a portion thereof intersecting the first notch; and the sixth sub-notch may have a curved shape open toward the third notch, the sixth sub-notch being separated from the third notch.

The sub-notch part may include a seventh sub-notch; the seventh sub-notch being between the main notch part and the edge of the vent plate and forming a closed, curved loop.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
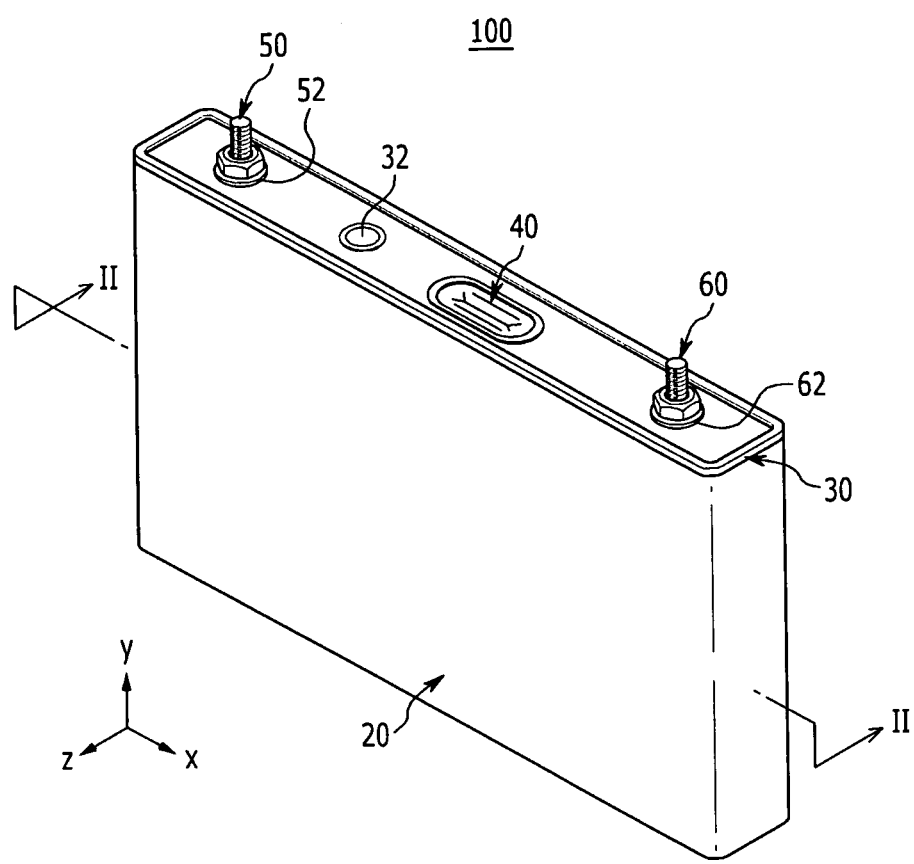
FIG. 1 illustrates a perspective view of a rechargeable battery according to an embodiment.

Korean Patent Application No. 10-2010-0078848, filed on Aug. 16, 2010, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
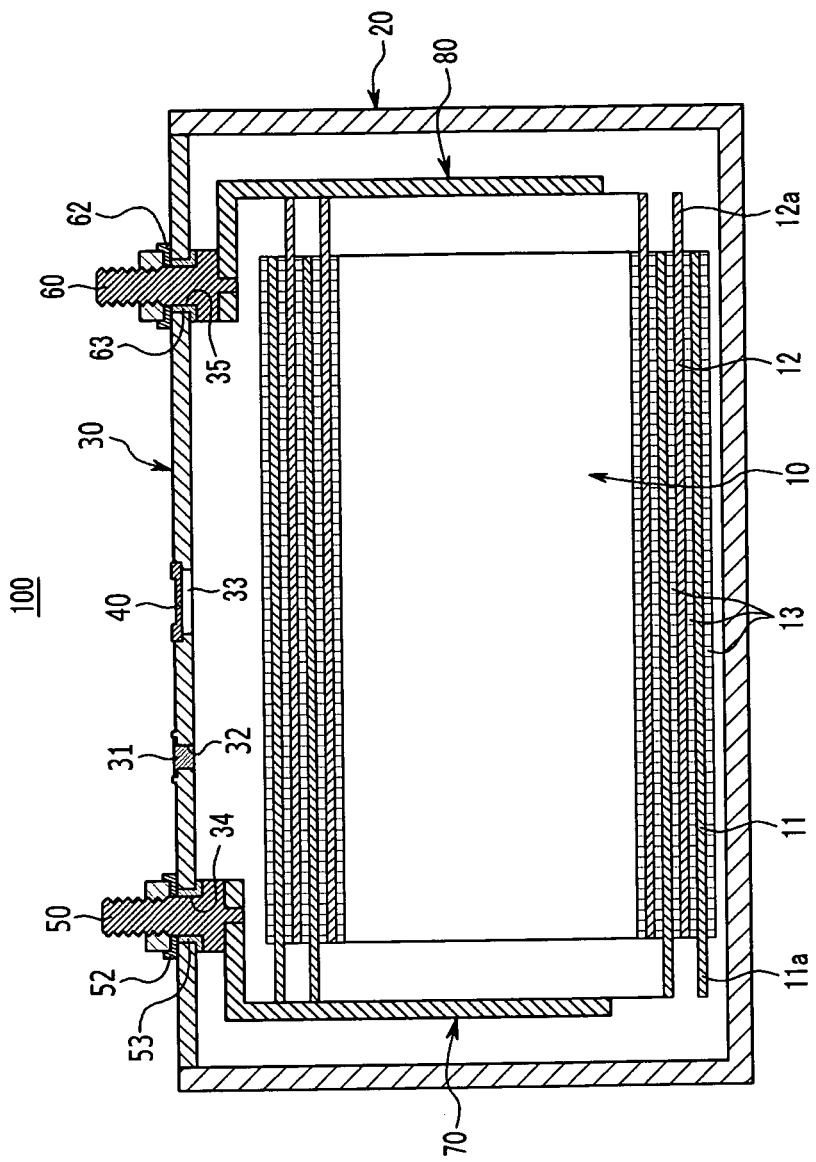
FIG. 2 illustrates a cross-sectional view of FIG. 1 taken along the line II-II.

FIG. 1 illustrates a perspective view of a rechargeable battery according to an embodiment. FIG. 2 illustrates a cross-sectional view of FIG. 1 taken along the line II-II.

Referring to FIG. 1 and FIG. 2, a rechargeable battery 100 according to the present embodiment may include an electrode assembly 10, a case 20, a cap plate 30 having a discharge hole 33, and a vent plate 40 coupled to one end of the discharge hole 33.

The electrode assembly 10 may include a separator 13 as an insulator, and an anode 11 and a cathode 12 disposed on respective surfaces of the separator 13. In an implementation, the electrode assembly 10 may be formed with a jelly roll shape by spiral-winding the anode 11 and the cathode 12 along with the separator 13. In another implementation, the electrode assembly 10 may be formed with a stack shape by depositing the anode 11, the cathode 12, and the separator 13.

The anode 11 and the cathode 12 may include a current collector made of a thin plate metal foil, and an active material coated on a surface of the current collector. The anode 11 and the cathode 12 may each include a coated region, in which an active material is coated on the current collector, and uncoated regions 11a and 12a without an active material coated on the current collector. The coated region may be formed on most of the anode 11 and the cathode 12 in the electrode assembly 10; and the uncoated regions 111 and 121 may be formed on sides of the coated region in the jelly roll shape.

The case 20 may form an entire exterior of the rechargeable battery 100 and may be made of a conductive metal, e.g., aluminum, an aluminum alloy, and/or nickel-plated steel. The case 20 may house or accommodate the electrode assembly 10. For example, the case 20 may have a hexahedral shape having an opening at one side thereof to receive the electrode assembly 10 having a shape corresponding to that of the case. The opening may face an upper direction (y-axis direction) of the case 20 shown in FIGS. 1 and 2.

The cap plate 30 may be formed of a thin, e.g., steel, sheet and may be coupled to the opening of the case 20 to seal the case 20. Thus, the cap plate 30 may block an outer part and an inner part of the case 20 from each other. Also, the cap plate 30 may connect the outer part and the inner part to each other. For example, the cap plate 30 may include an electrolyte solution hole 32 through which an electrolyte solution is injected inside the closed and sealed case 20. The electrolyte solution hole 32 may be sealed by a sealing cap 31 after the electrolyte solution is injected.

Electrode terminals 50 and 60 may protrude outside the cap plate 30. The electrode terminals 50 and 60 may be connected to an anode current collecting tab 70 and a cathode current collecting tab 80 respectively connected to the anode 11 and the cathode 12 of the electrode assembly 10 through terminal holes 34 and 35 in the cap plate 30.

At least one of the electrode terminals 50 and 60 may be electrically insulated from the cap plate 30. For example, the electrode terminals 50 and 60 may be formed by interposing outer insulators 52 and 62 and inner insulators 53 and 63 in the terminal holes 34 and 35.

The vent plate 40 may be coupled to one end of the discharge hole 33 in the cap plate 30. As shown in FIG. 2, the vent plate 40 may be coupled to an upper portion of the discharge hole 33 by, e.g., welding such as laser welding. In an implementation, the vent plate 40 may be coupled between the upper portion and a lower portion of the discharge hole 33 or may be formed at the lower portion of the discharge hole 33.

Figure 3:
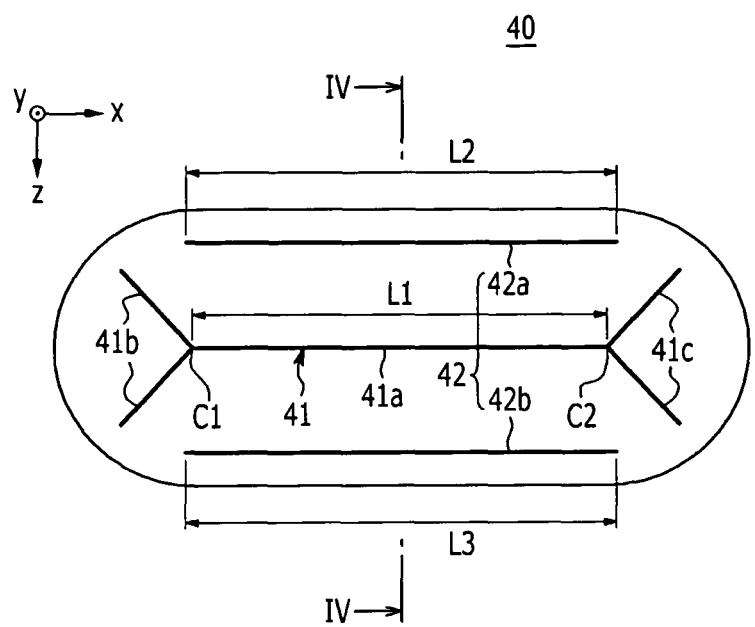
FIG. 3 illustrates a top plan view of a vent plate including a notch according to an embodiment.
Figure 4:
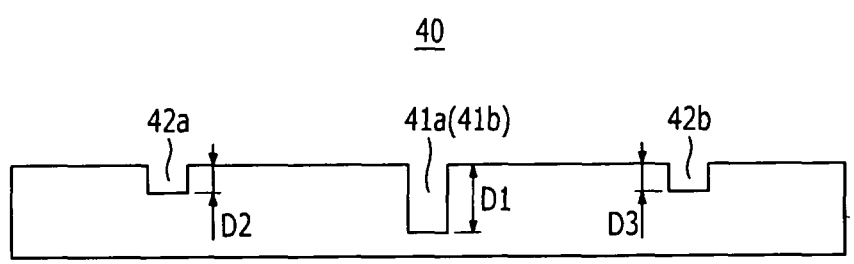
FIG. 4 illustrates a cross-sectional view of FIG. 3 taken along the line IV-IV.

FIG. 3 illustrates a top plan view of a vent plate including a notch according to an embodiment. FIG. 4 illustrates a cross-sectional view of FIG. 3 taken along the line IV-IV.

Referring to FIG. 3 and FIG. 4, the vent plate 40 according to the present embodiment may include a main notch part 41 including a first notch 41a, a second notch 41b, and a third notch 41c. The vent plate 40 may also include a sub-notch part 2a including a first sub-notch 42a and a second sub-notch 42b.

As shown in FIG. 3, the first notch 41a may extend along a horizontal direction (x-axis direction in FIG. 3) at a center of the vent plate 40, e.g., along a lengthwise direction of the vent plate 40. The second notch 41b and the third notch 41c may respectively include bent or angled portions that intersect ends of the first notch 41a, thereby forming intersection points C1 and C2. Ends of the second notch 41b and the third notch 41c may be close or adjacent to an edge of the vent plate 40.

The first sub-notch 42a may be separated or spaced apart from the first notch 41a. The first sub-notch 42a may be positioned parallel to the first notch 41a and close or adjacent to the edge of the vent plate 40. The second sub-notch 42b may be symmetrical to the first sub-notch 42a with respect to the first notch 41a. In an implementation, the first sub-notch 42a and the second sub-notch 42b may be between the first notch 41a and the edge of the vent plate 40.

The vent plate 40 may be opened when an internal pressure of the case 20, which may increase due to gas generated during charging and discharging of the electrode assembly 10, is greater than a predetermined pressure. Accordingly, the gas may be discharged. Thus, the vent plate 40 may prevent explosion of the rechargeable battery 100. The vent plate 40 may be deformed by welding heat generated when the vent plate 40 is coupled to the discharge hole 33 by the welding. If stress were to be concentrated at the main notch part 41 of the vent plate 40 such that the main notch part 41 is deformed, the main notch part 41 may be prematurely opened even if the internal pressure of the case 20 is less than the predetermined pressure.

According to the present embodiment, when the vent plate 40 is welded to the discharge hole 33, the first sub-notch 42a and the second sub-notch 42b may absorb stress in the z-axis direction of FIG. 3. Thus, deformation of the main notch part 41 due to the welding heat may be minimized. For example, the first sub-notch 42a and the second sub-notch 42b may absorb the stress in the z-axis direction caused by the deformation of the vent plate 40 such that the main notch part 41 may only open when the internal pressure of the case 20 is greater than the predetermined pressure.

As shown in FIG. 4, a depth D1 of the first notch 41a of the main notch part 41 may be deeper than depths D2 and D3 of the first sub-notch 42a and the second sub-notch 42b, respectively. Depths of the second notch 41b and the third notch 41c may be the same as the depth of the first notch 41a.

For example, if stress in the z-axis direction caused by deformation of the vent plate 40 is absorbed by the first and second sub-notches 42a and 42b, durability or strength of the first and second sub-notches 42a and 42b may be weaker than the strength prior to the absorption of the stress. However, when the internal pressure of the case 20 is greater than the predetermined pressure, the first and second sub-notches 42a and 42b may still not open and the main notch part 41 may open because the decreased strength of the first and second sub-notches 42a and 42b may still be higher than the strength of the main notch part 41. For example, if the depths D2 and D3 of the first and second sub-notches 42a and 42b are shallower than the depth D1 of the first notch 41a of the main notch part 41, it is possible for the strength of the first and second sub-notches 42a and 42b, weakened by the stress, to still be higher than the strength of the main notch part 41.

In an implementation, the depth D1 of the first notch 41a may be about equal to the depths D2 and D3 of the first sub-notch 42a and the second sub-notch 42b, respectively.

If the stress in the z-axis direction caused by the deformation of the vent plate 40 is absorbed by the first and second sub-notches 42a and 42b, the durability or strength of the first and second sub-notches 42a and 42b may be weaker than the strength thereof prior to the absorption of the stress.

Maintaining the depth D1 of the first notch 41a to be about the same as or deeper than the depths D2 and D3 of the first and second sub-notches 42a and 42b may help ensure that the durability or strength of the first and second sub-notches 42a and 42b, decreased by the stress, is still higher than that of the main notch part 41.

According to the present embodiment, a concentration stress may act on the second notch 41b and the third notch 41c at the intersection points C1 and C2 of the first notch 41a with the second notch 41b and the third notch 41c, respectively, due to the increased internal pressure caused by the gas generated inside the case 20.

Accordingly, the durability or strength of the vent plate 40 at the intersection points C1 and C2 of the first notch 41a with the second notch 41b and the third notch 41c may be decreased due to the increased internal pressure of the case 20. For example, although the stress causing the deformation of the vent plate 40 may act on the first sub-notch 42a and the second sub-notch 42b, it is possible for the durability or strength of the first sub-notch 42a and the second sub-notch 42b to still be higher than the strength of the main notch part 41. Accordingly, when the internal pressure of the case 20 is greater than the predetermined pressure, the opening may initiate at the weaker intersection points C1 and C2 of the first notch 41a with at the second notch 41b and the third notch 41c, rather than at the first sub-notch 42a and the second sub-notch 42b.

As a result, the main notch part 41 may be opened when the internal pressure of the case 20 is greater than the predetermined pressure. The sub-notch part 42 may absorb the stress generated by the deformation of the vent plate 40 such that the deformation and weakening of the main notch part 41 may be minimized.

A length L1 of the first notch 41a may be shorter than or about equal to lengths L2 and L3 of the first sub-notch 42a and the second sub-notch 42b, respectively. Accordingly, the stress effected in the z-axis direction of the vent plate 40 may be absorbed by the first sub-notch 42a and the second sub-notch 42b having the lengths L2 and L3 that are about equal to or longer than the length L1 of the first notch 41a. Thus, the deformation and weakening of the main notch part 41 may be minimized.

Figure 5:
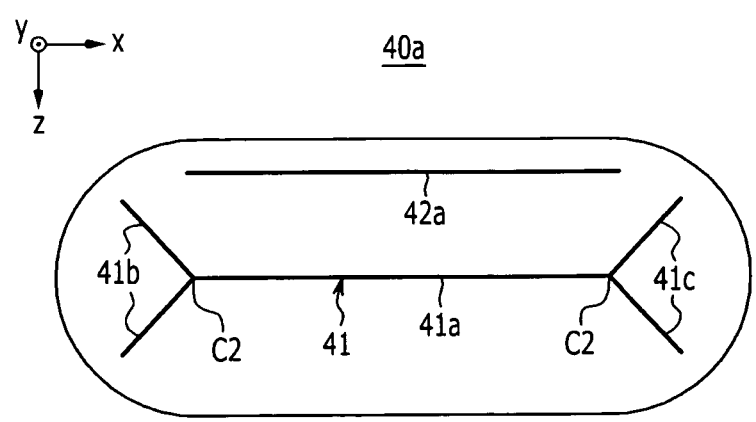
FIG. 5 illustrates a top plan view of a vent plate including a notch according to another embodiment.

FIG. 5 illustrates a top plan view of a vent plate including a notch according to another embodiment.

Referring to FIG. 5, the rechargeable battery of the present embodiment is the same as the rechargeable battery of the previous embodiment except for a vent plate 40a. Therefore, repeated descriptions of the same structures are omitted.

The vent plate 40a according to the present embodiment may include the main notch part 41 having the first notch 41a, the second notch 41b, and the third notch 41c, as well as the first sub-notch 42a, like the previous embodiment.

However, in contrast to the previous embodiment, the second sub-notch 42b symmetrical to the first sub-notch 42a with respect to the first notch 41a may not be included in the present embodiment.

Also, a position of the first sub-notch 42a is not limited to an upper side with respect to the first notch 41a. For example, the first sub-notch 42a may be formed below or on another side of the first notch 41a.

Figure 6:
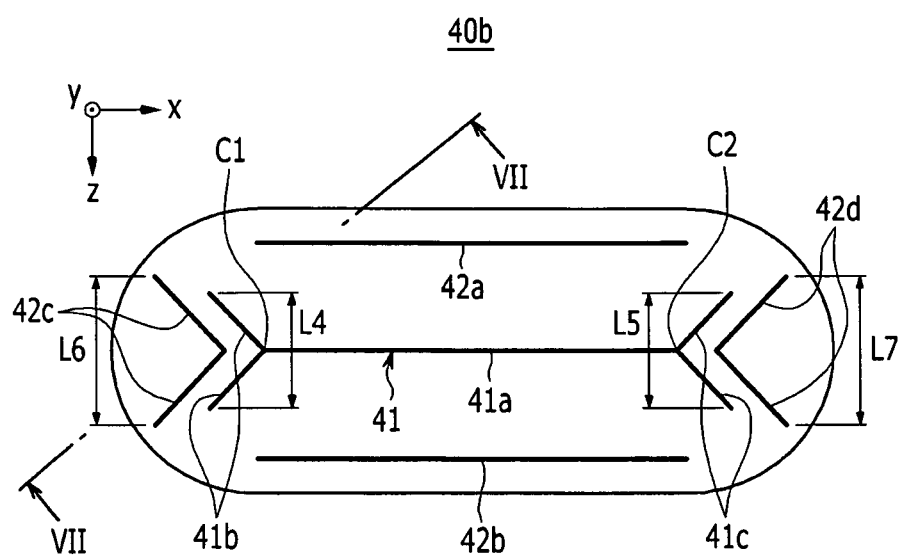
FIG. 6 illustrates a top plan view of a vent plate including a notch according to yet another embodiment.
Figure 7:
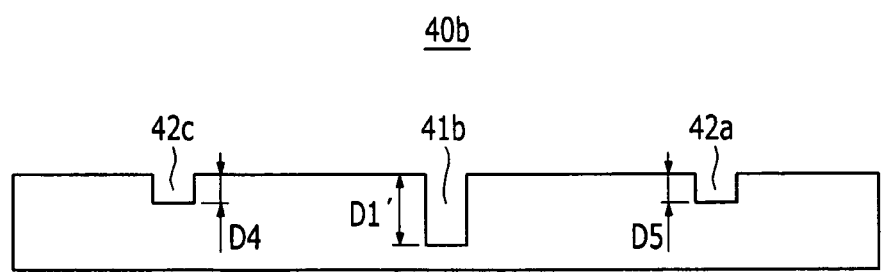
FIG. 7 illustrates a cross-sectional view of FIG. 6 taken along the line VII-VII.

FIG. 6 illustrates a top plan view of a vent plate including a notch according to yet another embodiment. FIG. 7 illustrates a cross-sectional view of FIG. 6 taken along the line VII-VII.

Referring to FIG. 6 and FIG. 7, the rechargeable battery according to the present embodiment is the same as the rechargeable battery of the previous embodiment except for a vent plate 40b. Thus, repeated descriptions of the same structures are omitted.

The vent plate 40b according to the present embodiment may include the main notch part 41 including the first notch 41a, the second notch 41b, and the third notch 41c, as well as the first sub-notch 42a and the second sub-notch 42b, like the previous embodiment. The vent plate 40b may further include a third sub-notch 42c and a fourth sub-notch 42d of the sub-notch part 42.

As shown in FIG. 6, the third sub-notch 42c may be between the second notch 41b and the edge of the vent plate 40b. The fourth sub-notch 42d may be between the third notch 41c and the edge of the vent plate 40b. The third sub-notch 42c may have a bent or angled shape corresponding to the shape of the second notch 41b and may be separated or spaced apart from the second notch 41b. The fourth sub-notch 42d may be symmetrical to the third sub-notch 42c with respect to the first notch 41a. Accordingly, the fourth sub-notch 42d may have a bent or angled shape corresponding to the shape of the third notch 41c and may be separated or spaced apart from the third notch 41c. In an implementation, a length of the second notch 41b may be shorter than or about equal to a length of the third sub-notch 42c.

As described above with respect to the previous embodiment, the vent plate 40b may be opened and may discharge gas when the internal pressure of the case 20 is greater than the predetermined pressure due to the gas generated during charging and discharging of the electrode assembly 10. Thus, the vent plate 40b may prevent explosion of the rechargeable battery 100.

Deformation of the vent plate 40b may occur due to welding heat generated when the vent plate 40b is coupled to the discharge hole 33. For example, if stress were to be concentrated on the main notch part 41 of the vent plate 40b and the main notch part 41 deformed, the main notch part 41 may prematurely open, even if the internal pressure of the case 20 is less than the predetermined pressure.

Accordingly, as shown in FIG. 6, stress acting in the z-axis direction may be absorbed by the first sub-notch 42a and the second sub-notch 42b; and stress acting in the x-axis direction may be absorbed by the third sub-notch 42c and the fourth sub-notch 42d. Thus, deformation of the main notch part 41 may be further reduced compared with the previous embodiment.

Hereinafter, a description of the stress in the vent plate 40b being absorbed by the first and second sub-notches 42a and 42b is the same as that of the previous embodiment and is thus omitted. Accordingly, absorption of the stress through the third and fourth sub-notches 42c and 42d will be described.

As shown in FIG. 7, a depth D1' of the second notch 41b of the main notch part 41 may be deeper than depths D4 and D5 of the third sub-notch 42c and the first sub-notch 42a, respectively. In addition, the depth of the first notch 41a and the depth of the third notch 41c may be about equal to the depth of the second notch 41b. In an implementation, the depth of the fourth sub-notch 42d may be about the same as the depth D4 of the third sub-notch 42c.

For example, if stress in the x-axis direction caused by the deformation of the vent plate 40b is absorbed by the third and fourth sub-notches 42c and 42d, the durability or strength of the third and fourth sub-notches 42c and 42d may be lower or weaker than the durability or strength thereof prior to the absorption of the stress. However, when the internal pressure of the case 20 is greater than the predetermined pressure, the third and fourth sub-notches 42c and 42d may still not open and the main notch part 41 may open, because the decreased strength of the third and fourth sub-notches 42c and 42d may still be higher than that of the main notch part 41. For example, if the depths of the third and fourth sub-notch 42c and 42d are shallower than the depth D1' of the second notch 41b, it is possible for the strength of the third sub-notch 42c and the fourth sub-notch 42d, weakened by the stress, to still be higher than the strength of the main notch part 41.

In an implementation, the depth D1' of the second notch 41b may be about equal to the depths of the third sub-notch 42c and the fourth sub-notch 42d, respectively.

If the stress in the x-axis direction caused by the deformation of the vent plate 40b is absorbed by the third and fourth sub-notches 42c and 42d, the durability or strength of the third and fourth sub-notches 42c and 42d may be weaker than the strength thereof prior to the absorption of the stress.

Maintaining the depth D1' of the second notch 41b to be the same as or deeper than the depths of the third and fourth sub-notches 42c and 42d may help ensure that the durability or strength of the third and fourth sub-notch 42c and 42d, weakened by the stress, is still higher than the strength of the main notch part 41.

According to the present embodiment, a concentration stress may act on the second notch 41b and the third notch 41c at the intersection points C1 and C2 of the first notch 41a with the second notch 41b and the third notch 41c, respectively due to the increased internal pressure caused by the gas generated inside the case 20.

Accordingly, the durability or strength at the intersection points C1 and C2 of the first notch 41a with and the second notch 41b and the third notch 41c may be decreased due to the increased internal pressure of the case 20. For example, although the stress caused by the deformation of the vent plate 40 may act on the third sub-notch 42c and the fourth sub-notch 42d, it is possible for the durability or strength of the third sub-notch 42c and the fourth sub-notch 42d to still be higher than the durability or strength of the main notch part 41. Accordingly, when the internal pressure of the case 20 is greater than the predetermined pressure, the opening may initiate at the weaker intersection points C1 and C2 of the first notch 41a with and at the second notch 41b and the third notch 41c, rather than at the third sub-notch 42c and the fourth sub-notch 42d.

As a result, the main notch part 41 may be opened when the internal pressure of the case 20 is greater than the predetermined pressure. In addition, the first to fourth sub-notches 42a, 42b, 42c, and 42d may absorb stress generated by the deformation of the vent plate 40b such that the deformation of the main notch part 41 may be minimized.

Figure 8:
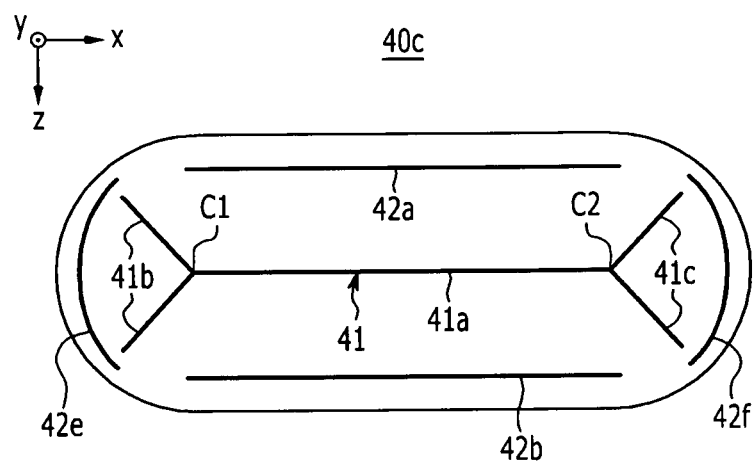
FIG. 8 illustrates a top plan view of a vent plate including a notch according to still another embodiment.

FIG. 8 illustrates a top plan view of a vent plate including a notch according to still another embodiment.

Referring to FIG. 8, the rechargeable battery of the present embodiment is the same as the rechargeable battery of the previous embodiment except for a vent plate 40c. Thus, repeated descriptions of the same structures are omitted.

The vent plate 40c according to the present embodiment may include the main notch part 41 having the first notch 41a, the second notch 41b, and the third notch 41c, as well as the first sub-notch 42a and the second sub-notch 42b, like the previous embodiment. In addition, the vent plate 40c may include a fifth sub-notch 42e and a sixth sub-notch 42f.

As shown in FIG. 8, the fifth sub-notch 42e may be close to the edge of the vent plate 40c and adjacent to the second notch 41b; and the sixth sub-notch 42f may be close to the edge of the vent plate 40c and adjacent to the third notch 41c. The fifth sub-notch 42e may have a curved shape in a direction opposite to the bent or angled direction of the second notch 41b and may be separated or spaced apart from the second notch 41b. For example, the curved shape of the fifth sub-notch 42e may be open toward the second notch 41b. The sixth sub-notch 42f may be symmetrical to the fifth sub-notch 42e with respect to the first notch 41a. For example, the sixth sub-notch 42f may have a curved shape in a direction opposite to the bent direction of the third notch 41c and may be separated or spaced apart from the third notch 41c, e.g., the curved shape of the sixth sub-notch 42f may be open toward the third notch 41c.

Hereinafter, a description of stress generated in the vent plate 40c and being absorbed by the first and second sub-notches 42a and 42b is the same as that of the previous embodiment and thus is omitted. Also, a description of the stress generated in the x-direction and being absorbed by the fifth and sixth sub-notches 42e and 42f is the same as that of the stress generated in the vent plate 40b and being absorbed by the third and fourth sub-notch 42c and 42d in the previous embodiment and thus is omitted.

The first and second sub-notches 42a and 42b may absorb the stress acting in the z-axis direction of FIG. 8 caused by the deformation of the vent plate 40c; and the fifth and sixth sub-notches 42e and 42f may absorb the stress acting in the x-axis direction of FIG. 8 caused by the deformation of the vent plate 40c.

Accordingly, it is possible that the absorption of the stress by the first and second sub-notches 42a and 42b and the fifth and sixth sub-notches 42e and 42f further minimizes or reduces the deformation of the main notch part 41.

Figure 9:
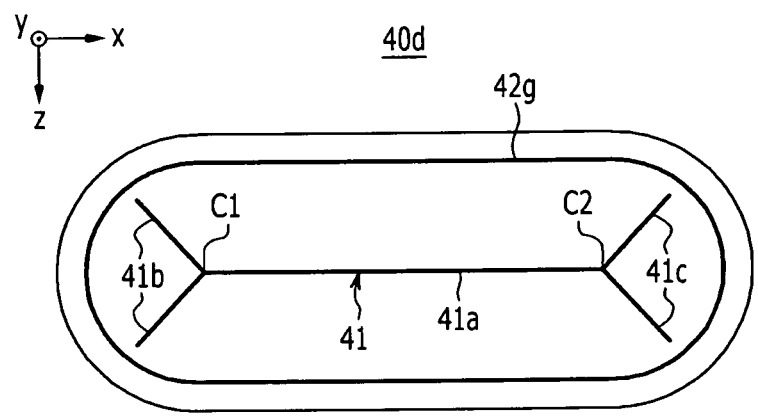
FIG. 9 illustrates a top plan view of a vent plate including a notch according to still another embodiment.

FIG. 9 illustrates a top plan view of a vent plate including a notch according to yet another embodiment.

Referring to FIG. 9, the rechargeable battery of the present embodiment is the same as the rechargeable battery of the previous embodiment except for a vent plate 40d. Accordingly, repeated descriptions of the same structures are omitted.

The vent plate 40d according to present embodiment may include the main notch part 41 having the first notch 41a, the second notch 41b, and the third notch 41c, as well as the sub-notch part 2a including a seventh sub-notch 42g.

As shown in FIG. 9, the seventh sub-notch 42g may be between the main notch part 41 and the edge of the vent plate 40d, e.g., may be arranged to form a closed curved line or loop.

In addition, a depth of the seventh sub-notch 42g may be about equal to or shallower than the depth of the main notch part 41. A length of the seventh sub-notch 42g may be about equal to or longer than the length of the second notch 41b and the third notch 41c.

Hereinafter, a description of the stress acting in the x-axis and z-axis directions in FIG. 9 caused by the deformation of the vent plate 40d and being absorbed by the seventh sub-notch 42g is the same as that of the previous embodiments and thus is omitted.

As shown in FIG. 9, the seventh sub-notch 42g enclosing the main notch part 41 and having the closed curved line structure may absorb the stress acting in the x-axis direction and the z-axis direction and caused by the deformation of the vent plate 40d. Thus, the deformation of the main notch part 41 may be further minimized or reduced, compared with the previous embodiment.

According to the embodiments, even if the vent plate is coupled to an end of the discharge hole by laser welding and the vent plate is deformed by the welding heat, premature opening of the vent plate may be prevented, e.g., when the internal pressure of the rechargeable battery is less than the predetermined pressure.

The embodiments provide a rechargeable battery including a vent plate including a notch structure that is capable of absorbing stress generated by welding heat.

According to the embodiments, a vent plate including the sub-notch part that absorbs stress to the vent plate caused by the welding heat may be provided such that premature opening of the main notch part of the vent plate when the internal pressure of the case is below the predetermined pressure may be prevented.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A rechargeable battery, comprising:
an electrode assembly, the electrode assembly including an anode, a cathode, and a separator therebetween;
a case accommodating the electrode assembly, the case having an opening;
a cap plate coupled to the opening of the case, the cap plate having a discharge hole; and
a vent plate weldably coupled to the discharge hole,
wherein the vent plate includes:
an exterior planar surface;
a main notch part sensitive to welding stress from weldable coupling of the vent plate to the discharge hole, the main notch part being spaced apart from an edge of the vent plate and including a first notch at a center of the vent plate, the first notch extending along a lengthwise direction of the vent plate; and
a welding stress-absorbing sub-notch part separated from the main notch part, the sub-notch part being between the main notch part and the edge of the vent plate and including a first sub-notch extending lengthwise along a same direction as the first notch, an entirety of the first sub-notch extending in parallel with the first notch, a length of the first notch being shorter than a length of the first sub-notch, and a depth of the first notch being deeper than a depth of the first sub-notch such that the sub-notch part absorbs welding stress from the weldable coupling of the vent plate to the discharge hole and inhibits premature opening of the main notch part.

2. The rechargeable battery as claimed in claim 1, wherein the sub-notch part is closer to the edge of the vent plate than the main notch part.

3. The rechargeable battery as claimed in claim 1, wherein:
the main notch part includes
a second notch intersecting the first notch.

4. The rechargeable battery as claimed in claim 3, wherein the first sub-notch of the sub-notch part is between the first notch of the main notch part and the edge of the vent plate.

5. The rechargeable battery as claimed in claim 3, wherein the sub-notch part further includes a second sub-notch, the first and second sub-notches being symmetrically arranged relative to the first notch.

6. The rechargeable battery as claimed in claim 1, wherein the main notch part includes
a second notch intersecting the first notch, the second notch having an angled shape at a portion thereof intersecting the first notch,
the sub-notch part has an angled shape corresponding to the angled shape of the second notch, the sub-notch part including a third sub-notch separated from the second notch.

7. The rechargeable battery as claimed in claim 6, wherein a length of the second notch of the main notch part is shorter than a length of the third sub-notch of the sub-notch part.

8. The rechargeable battery as claimed in claim 6, wherein the third sub-notch of the sub-notch part is between the second notch of the main notch part and the edge of the vent plate.

9. The rechargeable battery as claimed in claim 6, wherein:
the main notch part further includes a third notch, the second and third notches being symmetrically arranged relative to the first notch;
the sub-notch part includes a fourth notch, the third and fourth notches being symmetrically arranged relative to the first notch;
the third notch has an angled shape at a portion thereof intersecting the first notch; and
the fourth sub-notch has an angled shape corresponding to the angled shape of the third notch, the fourth sub-notch being separated from the third notch.

10. The rechargeable battery as claimed in claim 1, wherein:
the main notch part includes a second notch intersecting the first notch, the second notch having an angled shape at a portion thereof intersecting the first notch, and the sub-notch part has a curved shape open toward the second notch, the sub-notch part including a fifth sub-notch separated from the second notch.

11. The rechargeable battery as claimed in claim 10, wherein:

the main notch part further includes a third notch, the second and third notches being symmetrically arranged relative to the first notch;

the sub-notch part further includes a sixth sub-notch, the fifth and sixth sub-notches being symmetrically arranged relative to the first notch;

the third notch has an angled shape at a portion thereof intersecting the first notch; and the sixth sub-notch has a curved shape open toward the third notch, the sixth sub-notch being separated from the third notch.

12. The rechargeable battery as claimed in claim 1, wherein the sub-notch part includes a seventh sub-notch; the seventh sub-notch being between the main notch part and the edge of the vent plate and forming a closed, curved loop.

\* \* \* \* \*